US012745097B2

(12) United States Patent
Albanese et al.

(10) Patent No.: US 12,745,097 B2
(45) Date of Patent: Sep. 22, 2026

(54) METHOD AND SYSTEM FOR DESIGN PLANNING OF A CELLULAR NETWORK

(71) Applicant: NEC Laboratories Europe GmbH, Heidelberg (DE)

(72) Inventors: Antonio Albanese, Heidelberg (DE); Vincenzo Sciancalepore, Heidelberg (DE); Xavier Costa-Perez, Heidelberg (DE)

(73) Assignee: NEC LABORATORIES EUROPE GMBH, Heidelberg (DE)

( * ) Notice: Subject to any disclaimer, the term of this patent is extended or adjusted under 35 U.S.C. 154(b) by 623 days.

(21) Appl. No.: 18/020,640

(22) PCT Filed: Feb. 5, 2021

(86) PCT No.: PCT/EP2021/052866

§ 371 (c)(1),
(2) Date: Feb. 10, 2023

(87) PCT Pub. No.: WO2022/033723

PCT Pub. Date: Feb. 17, 2022

(65) Prior Publication Data

US 2023/0308889 A1 Sep. 28, 2023

(30) Foreign Application Priority Data

Aug. 14, 2020 (EP) .................................... 20191206

(51) Int. Cl.
*H04W 16/18* (2009.01)
*H04W 24/02* (2009.01)

(52) U.S. Cl.
CPC .......... *H04W 16/18* (2013.01); *H04W 24/02* (2013.01)

(58) Field of Classification Search
CPC ............... H04W 48/16; H04W 72/542; H04W 28/0236; H04W 36/142; H04W 40/244;
(Continued)

(56) References Cited

U.S. PATENT DOCUMENTS 10,555,191 B1 2/2020 Jat et al.
11,172,246 B1 * 11/2021 Fang .................... H04L 65/613
(Continued)

FOREIGN PATENT DOCUMENTS

EP 3367720 A1 8/2018

OTHER PUBLICATIONS

Azar et al. (NPL—Planning Wireless Cellular Networks of the Future: Outlook, Challenges and Opportunities (Year: 2017).*
(Continued)

*Primary Examiner* — Quan M Hua
(74) *Attorney, Agent, or Firm* — Leydig, Voit & Mayer, Ltd.

(57) ABSTRACT

A computer-implemented method is provided for optimizing positioning performance of a cellular network. The method includes: defining a target area; identifying a set(S) of base station deployment candidate sites (j) within the target area; obtaining, by executing a joint performance optimization routine that jointly optimizes network throughput and positioning performance, wherein a tuning parameter regulates a throughput-positioning ratio of the joint performance optimization routine, active candidate sites as a subset of the set(S) of base station deployment candidate sites (j); and determining the obtained active candidate sites as the sites at which base stations are to be deployed.

18 Claims, 5 Drawing Sheets

(58) Field of Classification Search
CPC ... H04W 72/23; H04W 72/541; H04W 84/12; H04W 88/08; H04W 16/02; H04W 16/14; H04W 24/02; H04W 36/18; H04W 36/302; H04W 36/304; H04W 72/0453; H04W 72/56; H04W 16/18; H04W 16/22; H04W 16/32; H04W 24/00; H04W 28/08; H04W 36/0061; H04W 36/00835; H04W 36/0085; H04W 36/023; H04W 36/04; H04W 36/20; H04W 36/30; H04W 48/08; H04W 48/12; H04W 52/0245; H04W 72/0473; H04W 84/042
See application file for complete search history.

(56) References Cited

U.S. PATENT DOCUMENTS

2014/0213257 A1* 7/2014 Ryan ............... H04W 36/00835 455/436
2016/0165462 A1* 6/2016 Tan ....................... H04W 16/10 370/254
2016/0174080 A1* 6/2016 Siradjev ................ H04L 47/125 455/422.1
2021/0392517 A1* 12/2021 Khalid .................... H04W 8/22

OTHER PUBLICATIONS

Taufique, Azar et al.; "Planning Wireless Cellular Networks of Future: Outlook, Challenges and Opportunities"; *IEEE Access*; Mar. 21, 2017; pp. 4821-4845; vol. 5; XP011646930; IEEE; Piscataway, NJ, USA.
Hurley, Stephen et al.; "Modelling and planning fixed wireless networks"; *Wireless Networks*; Dec. 23, 2008; pp. 577-592; vol. 16, No. 3; XP019796308; Springer Science+Business Media; Berlin, Germany.
Nielsen, Jimmy Jessen et al.; "Location-quality-aware policy optimisation for relay selection in mobile networks"; *Wireless Networks*; Jun. 13, 2015; pp. 599-618; vol. 22, No. 2; XP035935500; ACM Publications; New York, NY, USA.

* cited by examiner $$\begin{aligned} \max_{\boldsymbol{A},\boldsymbol{x}} \quad & \min_{t\in\mathcal{T}} (\boldsymbol{r} - \mu\boldsymbol{b}) \\ \text{subject to} \quad & \boldsymbol{A} \leq \mathbf{1}_T\, \boldsymbol{x}^\intercal, \\ & \boldsymbol{A}\,\mathbf{1}_S \leq \mathbf{1}_T, \\ & \boldsymbol{x} \in \{0,1\}^S, \quad \boldsymbol{A} \in \{0,1\}^{T\times S}, \end{aligned}$$

Fig. 2

$$\begin{aligned} \max_{A,x} \quad & \min_{t \in T} r \\ \text{subject to} \quad & b \leq \zeta_b, \\ & A \leq \mathbf{1}_T x^{\intercal}, \\ & A\mathbf{1}_S \leq \mathbf{1}_T, \\ & x \in \{0,1\}^S, \quad A \in \{0,1\}^{T \times S}, \end{aligned}$$

Fig. 4

$$\begin{aligned} \min_{A,x} \quad & \max_{t \in T} b \\ \text{subject to} \quad & r \geq \zeta_r, \\ & A \leq \mathbf{1}_T x^{\intercal}, \\ & A\mathbf{1}_S \leq \mathbf{1}_T, \\ & x \in \{0,1\}^S, \quad A \in \{0,1\}^{T \times S}, \end{aligned}$$

Fig. 5

METHOD AND SYSTEM FOR DESIGN PLANNING OF A CELLULAR NETWORK

CROSS REFERENCE TO RELATED APPLICATIONS

This application is a U.S. National Phase application under 35 U.S.C. § 371 of International Application No. PCT/EP2021/052866, filed on Feb. 5, 2021, and claims benefit to European Patent Application No. EP 20191206.0, filed on Aug. 14, 2020. The International Application was published in English on Feb. 17, 2022 as WO 2022/033723 A1 under PCT Article 21 (2).

The project leading to this application has received funding from the European Union's Horizon 2020 research and innovation programme under grant agreement No 825012.

FIELD

The present invention relates to a computer-implemented method as well as to a computer system for design planning of a cellular network, in particular a 5G-NR network or beyond.

BACKGROUND

Accurate knowledge of users' positions is of paramount importance for network operators. Indeed, by means of such piece of information, they may enable themselves or allow over-the-top (OTT) business entities to deliver location-based added-value services in order to increase their revenue sources. Moreover, real-time users' positions can be exploited to effectively manage the network by performing users' flow forecasting and proactive resource allocation along the expected users' trajectories.

Therefore, network-based positioning is gaining more and more interest within the standardization of new cellular network technologies. In particular, positioning has been identified as a paramount characteristic for 5G networks as it supports the tracking of goods and products within kitting processes in manufacturing, helps driving automated guided vehicles (AGVs) in logistic operations or localizes victims and people in distress during rescue procedures. Therefore, 5G networks are expected to offer advanced features to handle it, such as wide bandwidth for time resolution, additional frequency bands and massive MIMO for the angle-of-arrival calculation. This fosters operators to rely on their own infrastructures to directly obtain such information without using third-party solutions, such as GLONASS, GPS or GALILEO.

For instance, 5G-NR will deliver much higher accuracy than the current LTE radio access technology (RAT), due to its higher bandwidth and superior RAT design (cf. R. Keating, M. Säily, J. Hulkkonen and J. Karjalainen, "Overview of Positioning in 5G New Radio", 2019 *16th International Symposium on Wireless Communication Systems* (ISWCS), pp. 320-324). However, such improvements will be only marginal if limited to the enhancement of single-link localization accuracy. In some embodiments, base station positions play a major role in localization accuracy as a sub-optimal placement may lead to i) high Geometrid Dilution of Precision (GDOP) as the positioning error along each axis depends on the information provided by ranging signals coming from any base station in that direction (cf. I. Sharp, K. Yu and Y. J. Guo, "GDOP Analysis for Positioning System Design", *IEEE Transactions on Vehicular Technology*, vol. 58, no. 7, pp. 3371-3382 Sep. 2009, doi: 10.1109/TVT.2009.2017270), and ii) possibly higher single-link measurement error due to higher path-loss attenuation or fading effects.

Indeed, state-of-the-art radio networks are designed to only optimize throughput (cf. Jyrki T. J. Penttinen, "Planning of the LTE-Advanced Radio Network", in *The LTE-Advanced Deployment Handbook: The Planning Guidelines for the Fourth Generation Networks*, Wiley, 2014, pp. 257-292) and neglect the User Equipment (UE) location accuracy, thus a paradigm shift is required in classical network design to take into account such a new KPI (Key Performance Indicator).

SUMMARY

In an embodiment, the present disclosure provides a computer-implemented method for optimizing positioning performance of a cellular network. The computer-implemented method comprises: defining a target area; identifying a set(S) of base station deployment candidate sites (j) within the target area; obtaining, by executing a joint performance optimization routine that aims at jointly optimizing network throughput and positioning performance, wherein a tuning parameter regulates a throughput-positioning ratio of the joint performance optimization routine, active candidate sites as a subset of the set(S) of base station deployment candidate sites (j); and determining the obtained active candidate sites as the sites at which base stations are to be deployed.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2 illustrates the problem formulation of a joint throughput-positioning radio planning system in accordance with an embodiment of the present invention;

FIG. 4 illustrates a throughput sub-problem formulation of a joint throughput-positioning radio planning system in accordance with an embodiment of the present invention;

FIG. 5 illustrates a positioning sub-problem formulation of a joint throughput-positioning radio planning system in accordance with an embodiment of the present invention.

DETAILED DESCRIPTION

Figure 1:
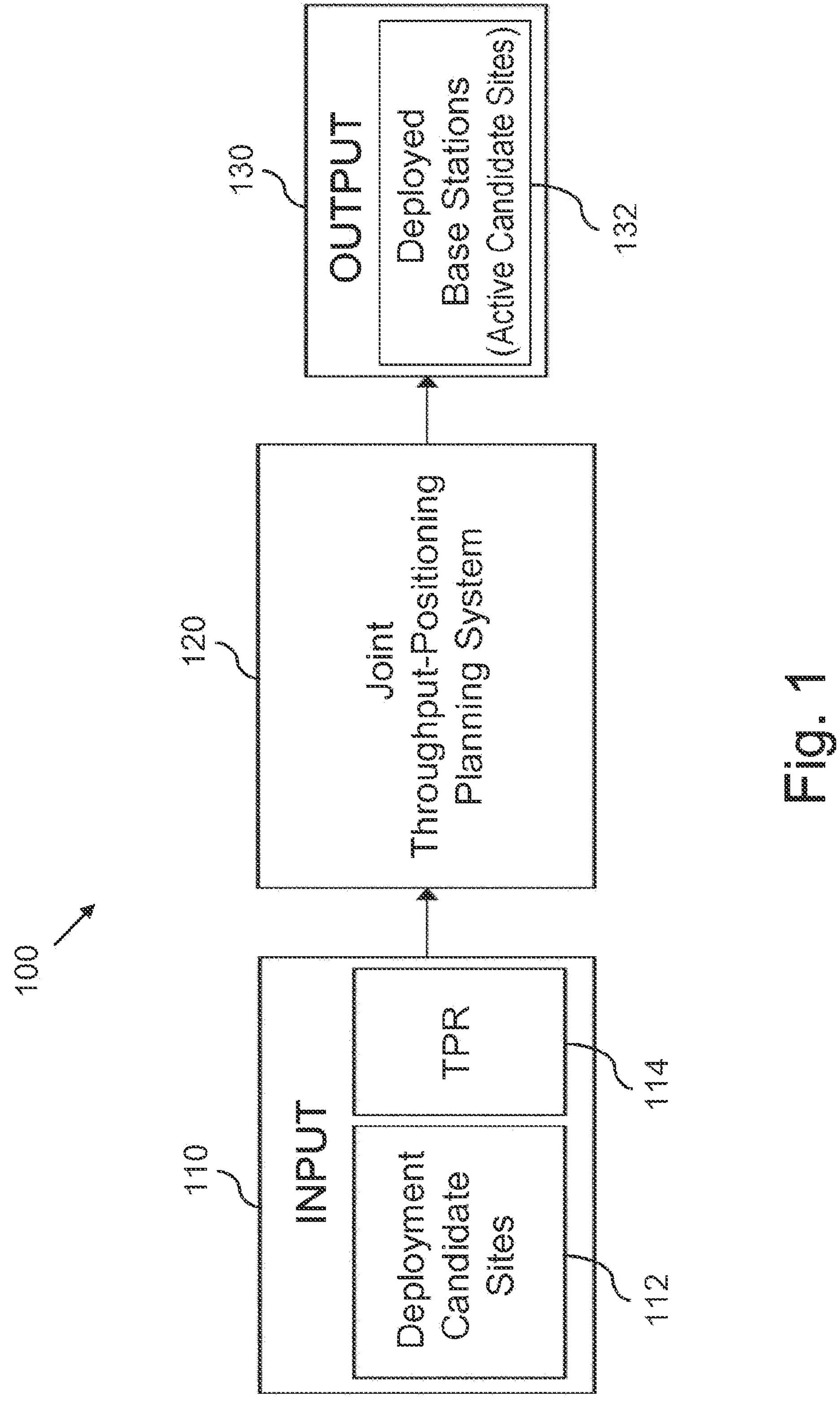
FIG. 1 is a high level diagram illustrating a general architecture of a system for design planning of a cellular network in accordance with an embodiment of the present invention.

In an embodiment, the present invention improves and further develops a method and a system of the initially described type for design planning of a cellular network in such a way that the positioning accuracy of localizing end-users by means only of network infrastructures is improved so as to allow network operators to deliver additional services to end-users and provide better quality of experience, while keeping reasonable the overall throughput performance.

In another embodiment, the present invention provides a computer-implemented method for optimizing positioning performance of a cellular network, in particular a 5G-NR network or beyond, the method comprising: defining a target area; identifying a set S of base station deployment candidate sites j within the target area; obtaining, by executing a joint performance optimization routine that aims at jointly optimizing network throughput and positioning performance, wherein a tuning parameter regulates a throughput-positioning ratio of the joint performance optimization routine, active candidate sites as a subset of the set S of base station deployment candidate sites j; and determining the obtained active candidate sites as the sites at which base stations are to be deployed.

In another embodiment, the present invention provides a computer system for optimizing positioning performance of a cellular network, in particular a 5G-NR network or beyond, the system comprising memory and one or more processors which, alone or in combination, are configured to provide for execution of the above method In another embodiment, the present invention provides a tangible, non-transitory computer-readable medium having instructions thereon, which upon execution by one or more processors, alone or in combination, provide for execution of the above method for optimizing positioning performance of a cellular network, in particular a 5G-NR network or beyond.

Embodiments of the present invention provide a cellular network design solution that pursues jointly localization accuracy and user throughput. In some embodiments, the present invention provides a solution for 5G (and beyond) network design that improves network-based localization performances by taking into account both user throughput, fairness and positioning KPIs (Key Performance Indicators).

Embodiments of the present invention provide methods and systems for 5G roll-out planning that, in contrast to state-of-the-art radio planning solutions, introduce mobile users localization accuracy guarantees. The radio planning framework is designed to address the needs of service providers when considering where to place 5G base stations to maximize throughput performance while guaranteeing a predefined localization accuracy target. The positioning-optimized radio planning solution according to embodiments of the present invention provides a solution for 5G (and beyond) network design that improves network-based localization performances by taking into account both users throughput, fairness and positioning KPIs. In order to achieve this, embodiments of the invention utilize a novel configuration parameter, herein referred to as Throughput-Positioning Ratio (TPR), which enables operators to configure customized policies towards an improved localization accuracy, for instance towards a maximum Position Error Bound (PEB). As such, embodiments of the invention achieve the advantage of enabling operators to offer more accurate localization services, which is a key requirement for various applications (e.g. for autonomous driving).

According to an embodiment, executing the joint performance optimization routine may include specifying a set T of test points t that sample the target area; and implementing decision variables $x_j \in \{0,1\}$ and $a_{tj} \in \{0,1\}$, wherein $x_j$ indicates whether a base station is deployed at candidate site j, and wherein $a_{tj}$ indicates the maximum Signal-to-Noise-and-Interference-Ratio, SINR, association between a UE at a test point t and candidate site j. When sampling the target area by means of the T test points, in each of the test points t a typical UE should meet the desired throughput and positioning performances.

According to an embodiment, the distribution of the test points t within the target area may be configured to match an expected distribution of cellular users within the target area. Nevertheless, the solution according to the present invention is not tailored to a specific set of test points and can be readily applied to any user distribution.

In a realistic operation scenario, network operators may submit to logistical and administrative constraints while deploying new base stations. On the one hand, they are required to comply with municipal regulations in terms of electromagnetic emissions and public land occupation. On the other hand, they seek one-to-one agreements with private parties to install network equipment in their facilities. Therefore, according to an embodiment, the set S of base station deployment candidate sites j may be derived from a pre-negotiation phase between operators and the above-mentioned third parties in consideration of logistical and/or administrative constraints.

According to an alternative embodiment, the set S of base station deployment candidate sites j may be determined to be a superset of the sites where LTE base stations have already been deployed. In this embodiment, it may be provided that the coordinates of pre-deployed/existing eNBs are fed into the joint performance optimization routine, and kept fixed during the optimization process.

It is worth pointing out that the joint performance optimization routine may likewise be executed even if there is not any a-priori knowledge of base station deployment candidate sites. In this case, according to another alternative embodiment, it may be provided that the set S of base station deployment candidate sites j is determined as some random sampling of the target area.

According to embodiments of the invention, executing the joint performance optimization routine includes solving a joint throughput-positioning radio planning problem formulated as a single max-min problem that aims at maximizing the balance among test points t, both with respect to network throughput and positioning performance. In this context, it may be provided that the tuning parameter that regulates the throughput-positioning ratio of the joint performance optimization routine is incorporated into the objective function.

In order to simplify the analytical manageability, embodiments of the present invention provide for methods and systems that do not tackle the joint optimization problem directly, but break down the original problem into two problems and derive a sub-optimal solution for each of them. Embodiments of the present invention relate to a solution wherein executing the joint performance optimization routine includes solving a network throughput optimization sub-problem that aims at optimizing the network throughput performance, while keeping the positioning performances below a configurable positioning performance threshold; and solving a positioning optimization sub-problem that aims at optimizing the positioning performance, while keeping the network throughput performance above a configurable network throughput performance threshold.

According to an embodiment may be provided that the network throughput optimization problem is formulated as a max-min problem that aims at maximizing the minimum network throughput experienced at the test points t. On the other hand, the positioning optimization problem may be formulated as a min-max problem that aims at minimizing the maximum position error bound, PEB, experienced at the test points t.

According to an embodiment, the positioning performance threshold and the network throughput performance threshold may be configured by adaptively processing the optimal values of each of the optimization sub-problems. In some embodiments, it may be provided that the optimization sub-problems are computed in a closed-loop fashion. In this context it may be provided that, first, a throughput optimization subroutine is run to obtain an optimal throughput performance value that represents a KPI for the system. Then, this optimal throughput performance value may be scaled and used as network throughput performance threshold for a positioning optimization subroutine to obtain an optimal positioning performance value, and vice-versa. This process may be iteratively repeated until convergence. The scaling process may be adaptive, meaning that the system monitors the convergence and the feasibility of each subproblem and changes the scaling factor accordingly.

According to an embodiment, the target area may encompass a number of pre-deployed legacy base stations (in particular, LTE base stations). In this case, the parameters of the joint performance optimization routine may be adapted in such a way that the pre-deployed base stations' provide a performance baseline for the joint performance optimization.

According to an embodiment, it may be provided that the tuning parameter regulates the flavor of the joint performance optimization, namely the throughput-positioning ratio (TPR), which indicates how much bit-rate an operator would compromise in order to gain one unit of accuracy in the users' positions. The tuning parameter may be implemented in such a way that backward compatibility in the network deployment process is provided by setting the tuning parameter to 0.

There are several ways how to design and further develop the teaching of the present invention in an advantageous way. To this end it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

The problem of selecting where to install base stations is fundamental since the first cellular network deployments. The typical KPI for such works is coverage probability, which is shown to be almost invariant with respect to base station location geometry in case of massive deployments. The advent of 5G and its advanced RAT has led to a paradigm change and brought up a series of new challenges, such as the usage of millimeter wave radio transceivers and ultra-dense non-uniform deployment in which case a number of heuristic algorithms have been developed to optimize both coverage and throughput. However, in order enable operators to offer advanced features and additional services providing better quality-of-experience, embodiments of the present invention address the joint optimization of network throughput and positioning performances in the network deployment process.

Embodiments of the present invention address the above-described crucial need of guaranteeing higher network-based localization accuracy by providing a novel network-design solution that takes into account jointly the required localization accuracy and the expected user throughput requirements while deciding the best position of the base stations among available candidate sites within a target area. Advantageously, the outcome of the joint performance optimization routine implemented in accordance with the embodiment may complement and support existing LTE deployments to improve this joint optimization goal as well as provide guidance on BSs positioning in 5G stand-alone (SA) deployments.

Embodiments of the present invention involve the following aspects:

- Joint optimization of localization and user throughput KPIs in next-generation radio deployments, e.g. 5G-NR but also 6G in the future
- Fine tuning of a novel parameter, namely throughput-positioning ratio (TPR) that can adapt to different operator's policies
- Iterative algorithm to decide the best base station position between available candidate sites in addition to existing RAT deployment according to joint throughput and localization policies (output).

Embodiments of the invention provide a network design solution involving a novel radio planning scheme that aims at finding the best balance between throughput and (network-based) localization performance of a cellular network based on operators' policies. Such policies and associated requirements may be taken into account by means of a tuning parameter that regulates the flavor of the joint performance optimization, hereinafter referred to as TPR (Throughput-Positioning Ratio). In some embodiments, this parameter may be defined to indicate how much bit-rate an operator would compromise in order to gain one unit of accuracy in the users' positions. The parameter may be implemented in such a way that, when being set to 0, the solution obtains similar results as the legacy radio planning solutions, thereby providing backward compatibility in the network deployment process.

According to an embodiment, the present invention provides a method for allocating next-generation base stations based on localization and throughput requirements, the method comprising the steps of

- admitting as input a list of available base stations candidate site, expected localization in terms of PEB, expected user throughout and TPR parameter;
- solving jointly an optimization problem by running a novel algorithm that balances throughput and localization accuracy based on the operator requirements; and
- providing the position of next-generation base stations as output.

FIG. 1 shows a high-level architecture of a computer implemented network design system 100 in accordance with the embodiment of the invention. The system 100 is fed with two inputs 110, namely a Deployment Candidate Sites 112 and the tuning parameter TPR 114. The Deployment Candidate Sites 112 take into account that in a realistic operation scenario, network operators may adhere to logistical and administrative constraints when deploying their base stations, which leads to the definition of a set of candidate sites within a given target area. In particular, they may comply with electromagnetic emission limits, take into account the physical footprint of network equipment on public/private land, obtain administrative authorizations, etc.

As a shown in FIG. 1, these inputs 110 are processed by a joint throughput-positioning planning system 120 that executes a joint performance optimization routine in order to calculate as output 130 an Active Candidate Sites 132, namely a subset of the Deployment Candidate Sites 112 at which base stations are (to be) deployed. The joint performance optimization routine may be executed by one or more processors, alone or in combination, of the joint throughput-positioning planning system 120. In some embodiments, a non-transitory computer readable medium includes a set of instructions that when executed by the processor(s) cause the processor(s) to perform the tasks of the joint performance optimization routine.

According to embodiments of the invention, the target area is sampled by means of T test points t, wherein a typical UE should meet the desired throughput and positioning performances. Preferably, the test point distribution matches the expected distribution of cellular users in such area.

To facilitate the installation procedure, it is assumed that base stations may be deployed only at operator-defined sites, thus calling for coordinate discretization. However, it is worth pointing out that the routing may likewise be executed even if there is not any a-priori knowledge of candidate sites (CSs) by taking as input some sampling of the target area. Herein, S denotes the set of such CSs with coordinates $s_j \in \Omega\ \forall j \in S$, where Ω denotes the target deployment area. For example, S may be a superset of the sites where LTE base stations have already been deployed.

As already mentioned above, the planning system 120 illustrated in FIG. 1 outputs the set of CSs wherein gNBs will be deployed, while providing the maximum-SINR association between the typical UE in each test point t and its associated base station. Therefore, decision variables $x_j \in \{0, 1\}$ and $a_{tj} \in \{0, 1\}$ are introduced, which indicate whether a gNB is deployed at CS j and the association between a typical UE at test point t and CS j, respectively.

In principle, to calculate the network throughput experienced at each test point t, the user throughput could be averaged over time. However, user rate depends on the serving base station scheduler, which assigns the optimal Modulation and Coding Scheme (MCS) given the current channel quality. Indeed, for the sake of tractability, we only consider Shannon's channel capacity, assuming that the base station schedulers perform near-optimal MCS assignments. This provides an upper bound on the throughput that a typical UE experiences at test point t with coordinates $p_t \in \Omega$ while being served by base station i.

According to an embodiment, the Joint Throughput-Positioning Planning System 120 is implemented and configured to solve the problem shown in FIG. 2. In the illustrated embodiment the problem is formalized as a joint throughput-positioning planning problem. Here, the joint goal is to maximize the fairness among test points, both throughput and positioning-wise. In this context it is important to note that the former objective maps onto a max-min problem, while the latter translates into a min-max problem. Against this background, the problem illustrated in FIG. 2 can be set up as follows:

First, as explained above, one may define as S the set of candidate sites and as T a set of test points, where the continuous target deployment is sampled. Then, decision variables x E {0,1} and $a_{tj} \in \{0,1\}$ are introduced, indicating whether a base station is deployed at candidate site j and the maximum Signal-to-Noise-and-Interference-Ratio (SINR) association between a typical UE at a point t and candidate site j, respectively.

With regard to the flavour tuning implemented according to embodiments of the invention, it should be noted that throughput and localization performances are different metrics that employ different unit of measurements. Such different nature raises the need for a tuning parameter μ, dubbed as Throughput-Positioning Ratio (TPR), which reflects the desired flavour of the planning solution. In some embodiments, TPR μ may take into account how much an operator values a unit gain towards throughput or localization performances, in other words how many bit/s would it put at stake to improve the PEB by 1 meter.

Therefore, to properly account for heterogeneous objectives, the design planning method according to embodiments of present invention introduces in the objective function the tuning factor. TPR in form of a scalar factor μ that trades off between throughput and positioning performances. In the extreme case of μ=0, the optimization will provide only throughput guarantees. Conversely, when μ→∞, the solution will optimize positioning performances regardless of the experienced throughput values.

In the problem of the Joint Throughput-Positioning Planning shown in FIG. 2 the decision variables $x_j \in \{0,1\}$ and $a_{tj} \in \{0,1\}$ are used as follows: $x=[x_1, \ldots, x_S]^T$, with $(\cdot)^T$ indicating the transpose operator, and $\{A\}_{tj}=a_{tj}$ is a matrix containing the association variables. Moreover, $1_K$ denotes a unit column vector of size K×1. The objective function is the fairness among every test point in terms of throughput and positioning performances, being the generic element $r_t$ of r $$r_t = \sum_{j \in S}\left(a_{tj}\log_2\left(1 + \frac{g_{tj}}{g'_{tj} + N'}\right)\right)W_g$$

where $W_g$ is the base stations bandwidth, $g_{tj}$ is the channel gain between point t and candidate site j, N' is the noise power and $$g'_{tj}$$

indicates the normalized interference experienced by a typical UE at site t given deployment decision x, namely $$g'_{tj} = \sum\nolimits_{n \in S \setminus \{j\}} g_{tn} x_n.$$

As already mentioned above, μ is the TPR of the specific operator, which drives the optimization objective according to operator's policies.

In addition, the generic element $b_t$ of b is the Position Error Bound (PEB) given such deployment decisions, that is $$b_t = \left(\frac{\sum_i v_{it} x_i}{\sum_{i<j} v_{it} x_i v_{jt} x_j \sin^2(\theta_{jt} - \theta_{it})}\right)^{\frac{1}{2}}$$

where parameters Vit can be written as in D. B. Jourdan, D. Dardari and M. Z. Win, "Position error bound for UWB localization in dense cluttered environments," in IEEE Transactions on Aerospace and Electronic Systems, vol. 44, no. 2, pp. 613-628, April 2008, the entire disclosure of which is hereby incorporated by reference herein, and depends on the real distance between test point t and candidate site j as well as on the measurement bias statistics, while $\theta_{jt}$ is their relative angular position.

With respect to the Position Error Bound, it should be noted that to assess the localization performance of cellular networks, the above embodiment leverages on the Cramér-

Rao Lower Bound (CRLB), which provides a lower bound on the covariance matrix of any unbiased estimator. This allows treating the problem in a general fashion, without tailoring it to a specific localization technique, while still providing useful insights on the expected performances of a real positioning system. The above formula gives the PEB of ToA (Time-of-Arrival) measurements with uniformly distributed measurement biases and represents a lower bound on the mean-square error (MSE) of the distance between the UE position and its corresponding estimate.

With respect to the ToA measurements, it should be noted that, generally, time-based positioning is a fundamental positioning technique, which combines Time-of-Flight (ToF) measurements related to a set of (at least three) base stations to derive the location of some UE by means of the multilateration technique. To this aim, the UE receives periodic Positioning Reference Signals (PRSs) from the serving and the adjacent base stations and records their respective Time of Arrivals (ToAs).

FIG. 2 shows a high-level architecture of a computer implemented network design system 200 in accordance with a second embodiment of the invention. Like in the embodiment described in connection with FIG. 1, the system 200 is fed with two inputs 210, namely a Deployment Candidate Sites 212 and the tuning parameter TPR 214. Both inputs 210 can be determined in the same or similar way as described above in connection with FIG. 1.

The planning tool 220 of the network design planning system 200 depicted in FIG. 2 is a closed-loop solution, where the joint throughput-positioning problem is decomposed into two subroutines, namely a throughput-optimized subroutine 222 and a positioning-optimized subroutine 224.

According to the illustrated embodiment, the throughput-optimized subroutine 222 solves a throughput sub-problem, which optimizes the network throughput r while enforcing that contribution b that takes into account the positioning performances is below a tunable threshold Tp. Conversely, the positioning sub-problem optimizes b while guaranteeing that r is over a tunable threshold tr. The respective sub-problems are shown in FIG. 4 and FIG. 5, respectively. The employed notation is the same as in FIG. 2.

According to embodiments, the thresholds $\tau_b$ and $\tau_r$ may be set by adaptively processing the optimal values of each sub-problem as follows: First, the throughput-optimized subroutine 222 obtains its optimal value r* that represents a KPI for the system. Then, this is scaled and used as $\tau_r$ for the next subroutine 224 and vice-versa. This process, which may be executed by a dedicated adaptive KPI processing component 226 of the planning tool 220, is iterative until convergence. In some embodiments, the scaling process is adaptive, meaning that the system monitors the convergence and the feasibility of each sub-problem and changes the scaling factor accordingly.

Figure 3:
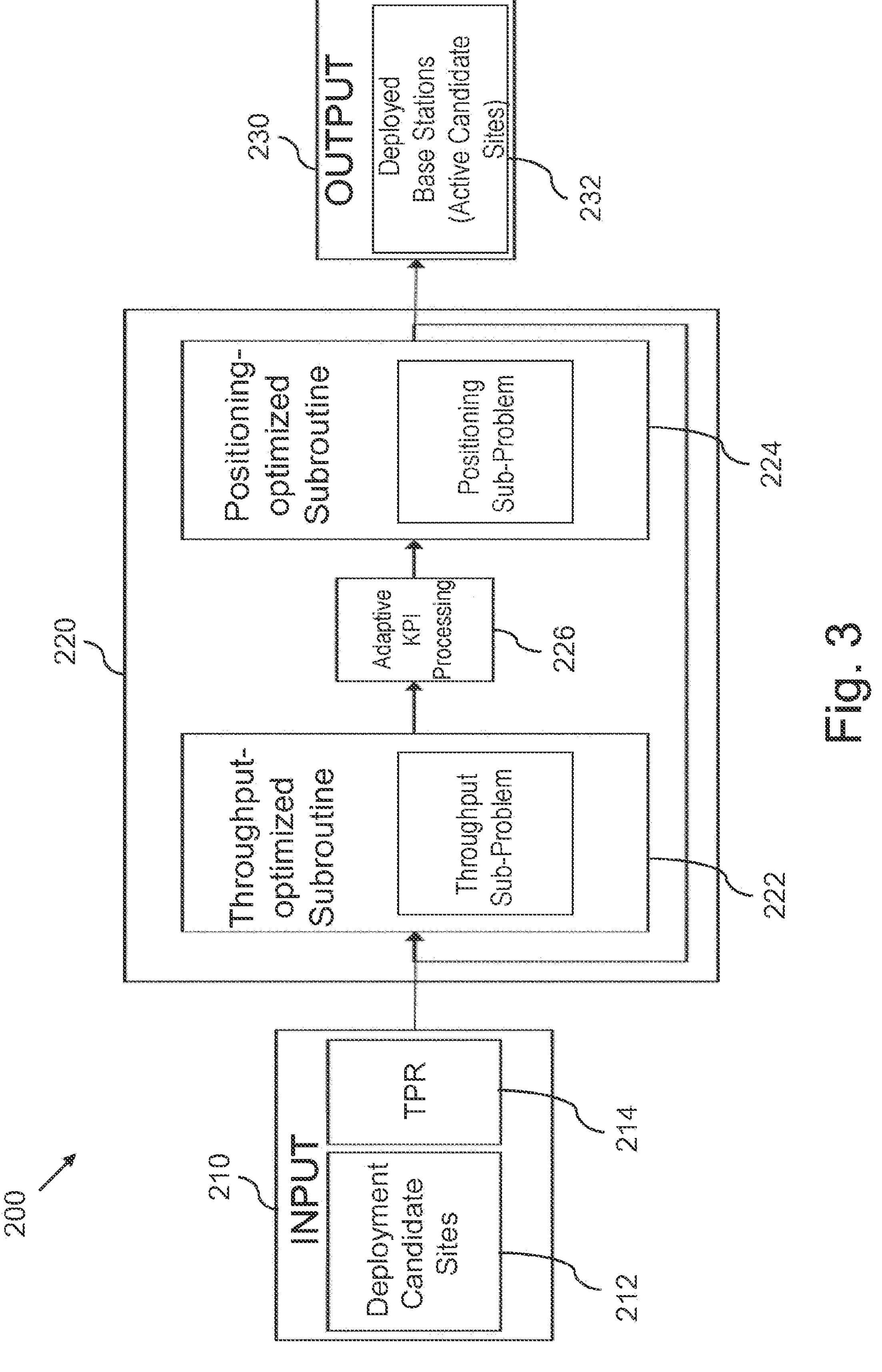
FIG. 3 is a high level diagram illustrating a closed-loop architecture of a system for design planning of a cellular network in accordance with an embodiment of the present invention.

As a shown in FIG. 3, the planning tool 220 provides as output 230 an Active Candidate Sites 232, namely a subset of the Deployment Candidate Sites 212 at which base stations are (to be) deployed. The throughput-optimized subroutine 222 and the positioning-optimized subroutine 224 may be executed by one or more processors, alone or in combination, of the planning tool 220. In some embodiments, a non-transitory computer readable medium includes a set of instructions that when executed by the processor(s) cause the processor(s) to perform the tasks of the performance optimization routines.

It should be noted that the joint planning problem to be solved by the joint throughput-positioning planning system 120 of FIG. 1, i.e. the joint planning problem shown in FIG. 2, is highly non-convex. In particular, the binary constraint leads to a combinatorial optimization problem, which is not solvable in polynomial time. Although, after relaxing this constraint, the set of constraints becomes convex, the joint objective function is still non-convex, being the sum of non-convex components r and b.

Moreover, both sub-problems shown in FIG. 3 are non-convex as they retain the non-convexity of the objective function (by keeping r and b, respectively) while adding a new set of non-convex constraints (including the threshold constraints on b and r respectively). Therefore, embodiments of the present invention may utilize an iterative algorithm that relies on a convex relaxation of such sub-problems.

Figure 6:
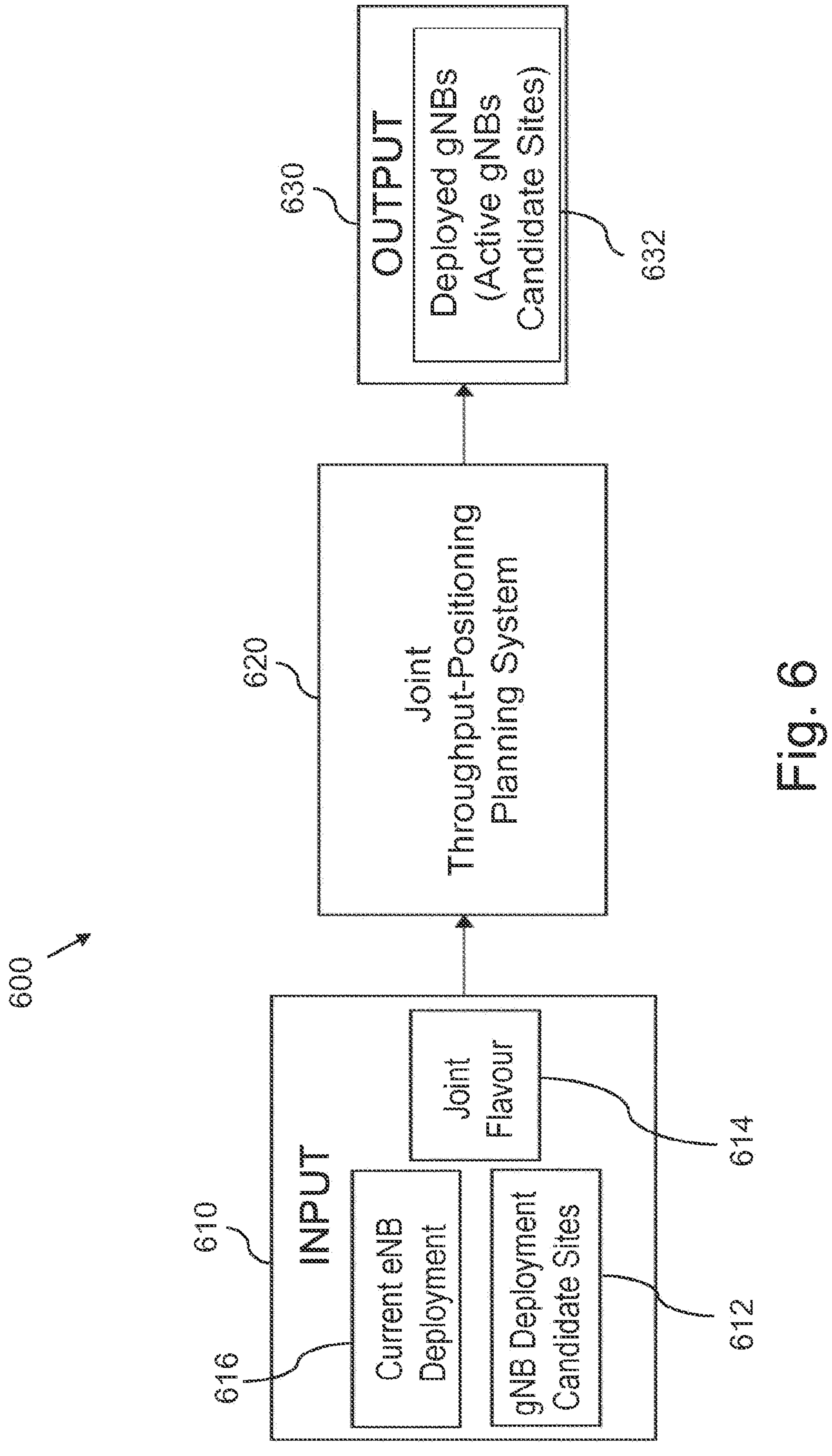
FIG. 6 is a high level diagram illustrating an architecture of a system for design planning of a cellular network with coexisting RAT in accordance with an embodiment of the present invention.

FIG. 6 shows a high-level architecture of a computer implemented network design system 600 in accordance with a third embodiment of the invention. The embodiment relates to a planning solution with coexisting RATs, in particular pre-existing LTE deployments. Accordingly, the input 610 to system 600 not only includes a Deployment Candidate Sites 612 and the tuning parameter TPR 614, like in the embodiments described in connection with FIGS. 1 and 3, but includes an additional input 610, namely the current pre-existing eNB deployment 616 of other RATs. While inputs 612 and 614 can be determined in the same or similar way as described above in connection with FIGS. 1 and 3, additional input 616 may just include the known coordinates of existing base stations.

Advantageously, the solution illustrated in FIG. 6 supports pre-existing deployments of other RATs as the joint planning problem keeps the same formulation. However, the elements $r_t$ and $b_t$ need to account for the performances provided by the other RAT deployment, which represent a baseline for the network. This translates into the following new objective functions $$r'_t = r_t + \left(1 - \sum_j a_{tj}\right)c_t, \text{ and}$$

$$b'_t = \left(\sum_j a_{tj}\right)b_t + \left(1 - \sum_j a_{tj}\right)u_t,$$

where $c_t$ is the throughput baseline and $u_t$ is the PEB baseline, obtained by setting all $x_j$ to 1 in the respective equations. It should be noted that for the PEB calculation it is assumed that a UE at a test point t is able to exploit all covering base stations for its localization, as indicated by 3GPP, "NG Radio Access Network (NG-RAN); Stage 2 functional specification of User Equipment (UE) positioning in NG-RAN", 3rd Generation Partnership Project (3GPP), Technical Specification (TS) 38.305, 2020, version 16.0.0, the entire disclosure of which is hereby incorporated by reference herein.

As a shown in FIG. 6, the planning tool 620 provides as output 630 an Active Candidate Sites 632, namely a subset of the Deployment Candidate Sites 612 at which base stations are (to be) deployed. The joint performance optimization routine may be executed by one or more processors, alone or in combination, of the planning tool 620. In some embodiments, a non-transitory computer readable medium includes a set of instructions that when executed by the processor(s) cause the processor(s) to perform the tasks of the performance optimization routines.

Validations of the proposed solutions by means of exhaustive simulations based on synthetic scenarios and realistic existing deployments unveiled that solutions according to embodiments of the invention outperform legacy approaches terms of Position Error Bound (PEB) and minimum experienced throughput, respectively. The obtained results, considering real base station deployments, demonstrate the effectiveness of the solution along with the trade-offs between throughput and localization to be expected.

Many modifications and other embodiments of the invention set forth herein will come to mind to the one skilled in the art to which the invention pertains having the benefit of the teaching's presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for optimizing positioning performance of a cellular network, the method comprising:

defining a target area;

identifying a set(S) of base station deployment candidate sites (j) within the target area;

obtaining, by executing a joint throughput-positioning radio planning problem formulated as a single max-min problem that uses a tuning parameter that regulates a throughput-positioning ratio for jointly optimizing network throughput and positioning performance, active candidate sites as a subset of the set(S) of base station deployment candidate sites (j), wherein the joint throughput-positioning radio planning problem takes as input the tuning parameter and the set(S) of the base station deployment candidate sites (j) and iteratively repeats until a convergence is reached that maximizes minimum network throughput experienced at test points (t) that sample the target area and minimizes a maximum position error bound (PEB) experienced at the test points (t), wherein the tuning parameter is a scalar factor that trades off between the network throughput and the positioning performance within the target area; and determining the obtained active candidate sites as the sites at which base stations are to be deployed.

2. The method according to claim 1, wherein executing the joint throughput-positioning radio planning problem includes:

specifying a set (T) of the test points (t) that sample the target area; and implementing decision variables $x_j \in \{0,1\}$ and $a_{tj} \in \{0,1\}$, wherein $x_j$ indicates whether a base station is deployed at a candidate site, and wherein $a_{tj}$ indicates the maximum Signal-to-Noise-and-Interference-Ratio (SINR) association between a user experience (UE) at a test point and the candidate site.

3. The method according to claim 2, wherein a distribution of the test points (t) within the target area matches an expected distribution of cellular users within the target area.

4. The method according to claim 1, wherein the set(S) of base station deployment candidate sites (j) is derived from a pre-negotiation phase between operators and third parties in consideration of logistical and/or administrative constraints; or wherein the set(S) of base station deployment candidate sites (j) is determined to be a superset of sites where LTE base stations have already been deployed; or wherein the set(S) of base station deployment candidate sites (j) is determined as some random sampling of the target area.

5. The method according to claim 1, wherein executing the joint throughput-positioning radio planning problem determines a balance among the test points (t), with respect to the network throughput and positioning performance.

6. The method according to claim 5, wherein an objective function of the joint throughput-positioning radio planning problem contains the tuning parameter that regulates the throughput-positioning ratio.

7. The method according to claim 1, wherein executing the joint throughput-positioning radio planning problem includes:

solving a network throughput optimization sub-problem that maximizes the network throughput performance, while keeping the positioning performances below a configurable positioning performance threshold; and solving a positioning optimization sub-problem that minimizes the PEB experienced at the test points (t), while keeping the network throughput performance above a configurable network throughput performance threshold.

8. The method according to claim 7, wherein the network throughput optimization sub-problem is formulated as a max-min problem that maximizes the minimum network throughput experienced at the test points t, and wherein the positioning optimization sub-problem is formulated as a min-max problem that minimizes the maximum PEB experienced at the test points (t).

9. The method according to claim 7, wherein the positioning performance threshold and the network throughput performance threshold are configured by adaptively processing optimal values of each of the optimization sub-problems.

10. The method according to claim 7, further comprising solving the network throughput and positioning optimization sub-problems in a closed-loop fashion, including the steps of:

determining a first optimized network throughput performance value by solving the network throughput optimization sub-problem, scaling the first optimized network throughput performance value and using the scaled value as network throughput performance threshold for solving the positioning optimization sub-problem, thereby obtaining a first optimized positioning performance value, and scaling the first optimized positioning performance value and using the scaled value as the positioning performance threshold for solving the network throughput optimization sub-problem, thereby obtaining a second optimized network throughput performance value.

11. The method according to claim 10, further comprising:

iterating through the network throughput and positioning optimization sub-problems until convergence.

12. The method according to claim 1, wherein the target area encompasses a number of pre-deployed legacy base stations that provide a performance baseline for the joint throughput-positioning radio planning problem.

13. The method according to claim 1, wherein the tuning parameter is implemented in such a way that backward compatibility in a network deployment process is provided by setting the tuning parameter to 0.

14. A system for optimizing positioning performance of a cellular network, in particular a 5G-NR network or beyond, the system comprising memory and one or more processors, the system configured to:

define a target area;

determine a set(S) of base station deployment candidate sites (j) within the target area;

set up a joint throughput-positioning radio planning problem formulated as a single max-min problem that uses a tuning parameter that regulates a throughput-positioning ratio for jointly optimizing network throughput and positioning performance; and obtain, by solving the joint throughput-positioning radio planning problem, active candidate sites as a subset of the set(S) of base station deployment candidate sites (j) and determine the obtained active candidate sites as the sites at which base stations are to be deployed, wherein the joint throughput-positioning radio planning problem takes as input the tuning parameter and the set(S) of the base station deployment candidate sites (j) and iteratively repeats until a convergence is reached that maximizes minimum network throughput experienced at test points (t) that sample the target area and minimizes a maximum position error bound (PEB) experienced at the test points (t), wherein the tuning parameter is a scalar factor that trades off between the network throughput and the positioning performance within the target area.

15. A non-transitory computer-readable medium having instructions thereon, which upon execution by one or more processors, alone or in combination, provide for execution of a method for optimizing positioning performance of a cellular network, the method comprising:

defining a target area;

determining a set(S) of base station deployment candidate sites (j) within the target area;

setting up a joint throughput-positioning radio planning problem formulated as a single max-min problem that uses a tuning parameter that regulates a throughput-positioning ration for jointly optimizing network throughput and positioning performance;

obtaining, by solving the joint throughput-positioning radio planning problem, active candidate sites as a subset of the set(S) of base station deployment candidate sites (j) and determining the obtained active candidate sites as the sites at which base stations are to be deployed, wherein the joint throughput-positioning radio planning problem takes as input the tuning parameter and the set(S) of the base station deployment candidate sites (j) and iteratively repeats until a convergence is reached that maximizes minimum network throughput experienced at test points (t) that sample the target area and minimizes a maximum position error bound (PEB) experienced at the test points (t), wherein the tuning parameter is a scalar factor that trades off between the network throughput and the positioning performance within the target area.

16. The method according to claim 1, wherein the cellular network is a 5G-NR network.

17. The system according to claim 14, wherein the cellular network is a 5G-NR network.

18. The method according to claim 1, further comprising sampling the target area by a set (T) of the test points (t), wherein a test point distribution of the test points (t) matches an expected distribution of cellular users in the target area.

* * * * *